June 12, 1956  L. PETERSEN  2,750,182
APPARATUS FOR FLASH HEATING OF PULVERULENT MATERIAL
Filed Feb. 20, 1953  3 Sheets-Sheet 1

INVENTOR
Louis Petersen
BY
Pennie Edmonds Morton Barrows Taylor
ATTORNEYS

June 12, 1956 L. PETERSEN 2,750,182
APPARATUS FOR FLASH HEATING OF PULVERULENT MATERIAL
Filed Feb. 20, 1953 3 Sheets-Sheet 2
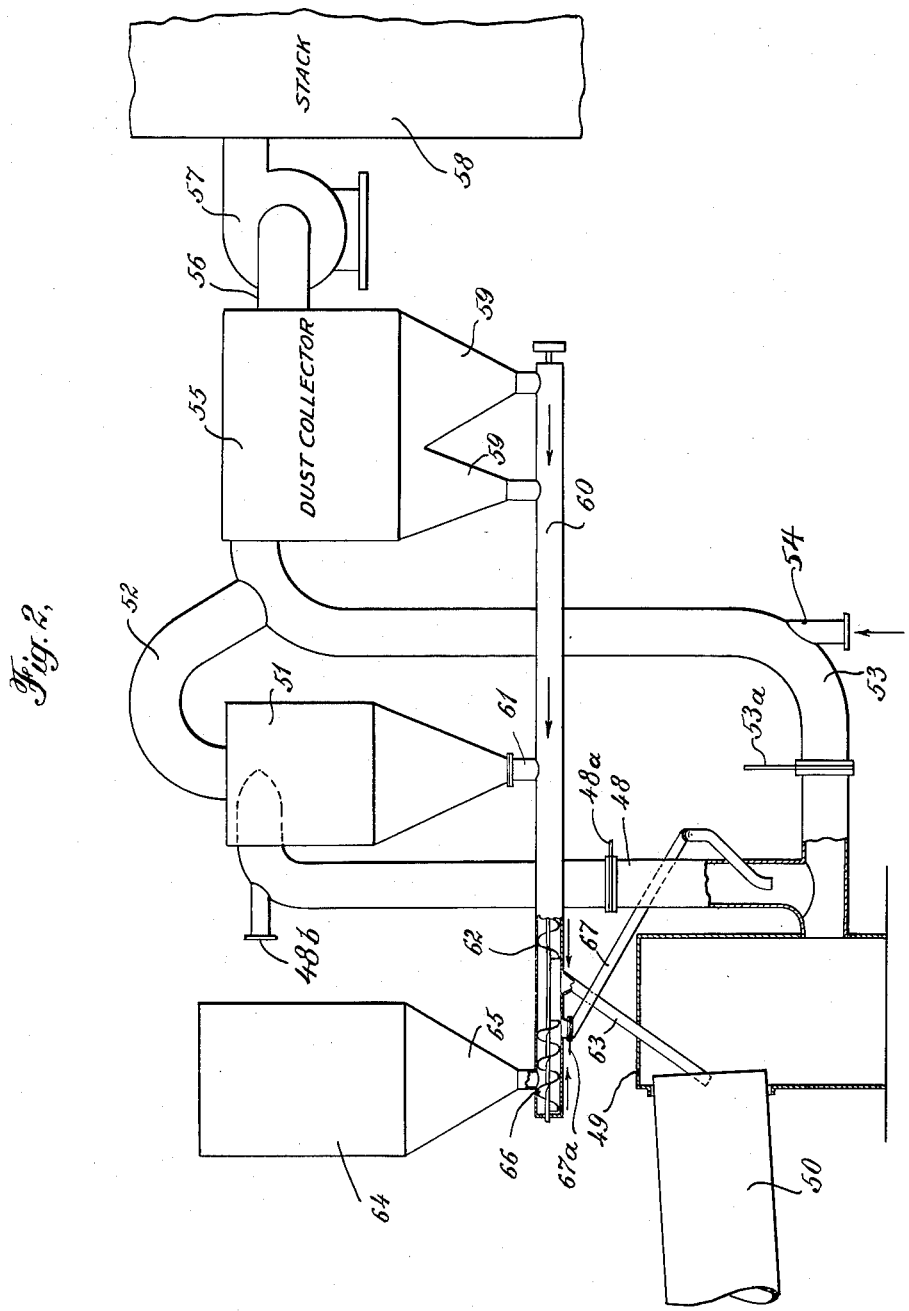

June 12, 1956 L. PETERSEN 2,750,182
APPARATUS FOR FLASH HEATING OF PULVERULENT MATERIAL
Filed Feb. 20, 1953 3 Sheets-Sheet 3
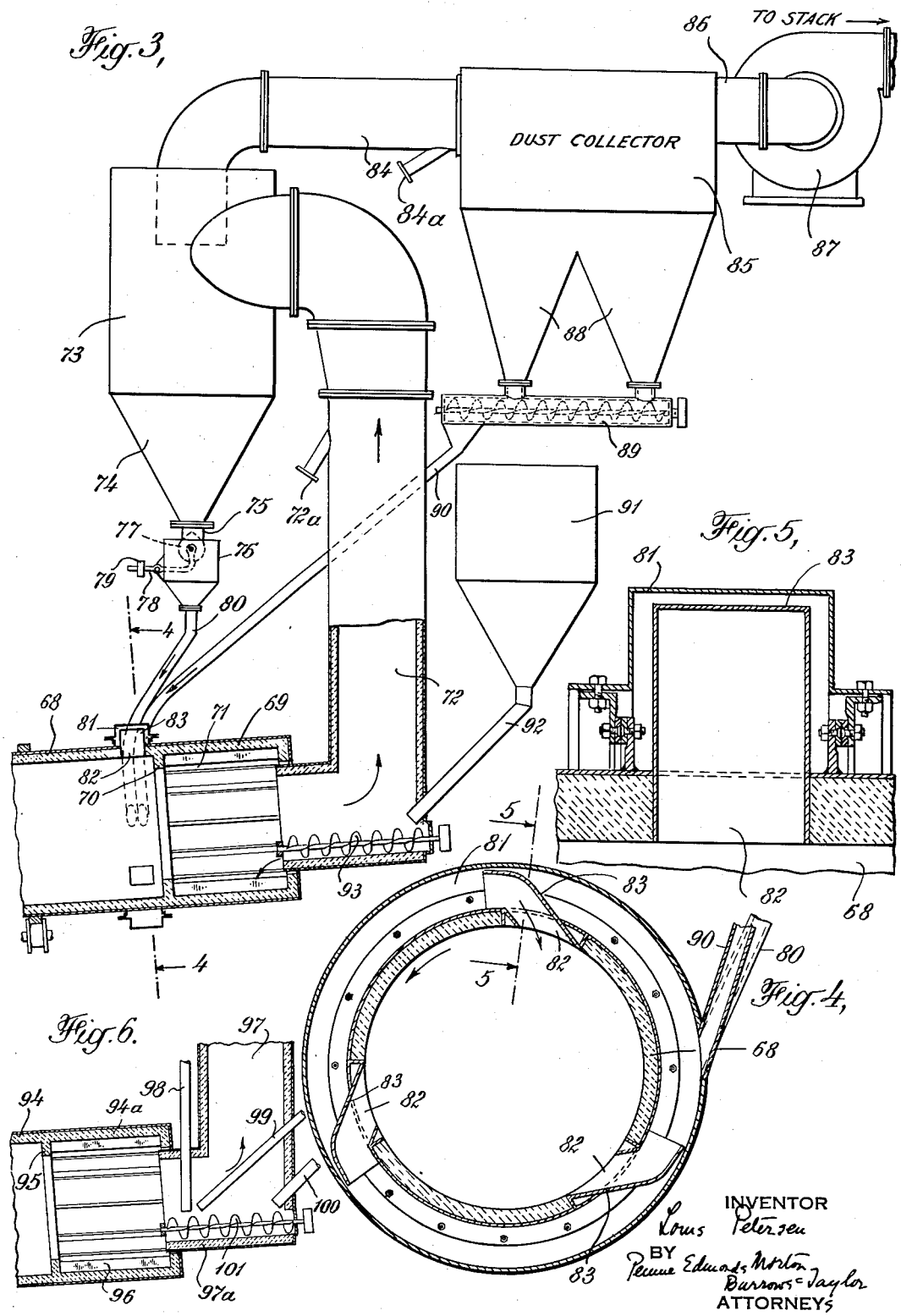

United States Patent Office 2,750,182
Patented June 12, 1956

2,750,182

APPARATUS FOR FLASH HEATING OF PULVERULENT MATERIAL

Louis Petersen, Forest Hills, N. Y., assignor to F. L. Smidth & Co., New York, N. Y., a corporation of New Jersey Application February 20, 1953, Serial No. 338,055

10 Claims. (Cl. 263—32)

This invention relates to the flash heating of pulverulent material, that is, the heating of the material, while it is being conveyed in suspension in a stream of hot gases. More particularly, the invention is concerned with a novel apparatus for flash heating, which can be utilized in different forms dependent upon local conditions and requirements. The hot gases employed in the apparatus are preferably the exhaust gases resulting from a burning or calcining operation and the pulverulent material being heated may then be the material to be burned or calcined. The apparatus may be employed in connection with apparatus for burning, roasting, sintering, and agglomerating operations in the treatment of ore, lime, blast furnace dust, etc. and may be used to especial advantage in heating the pulverulent raw material to be burned to produce cement clinker. Accordingly, forms of the apparatus for use in cement burning operations will be illustrated and described in detail for purposes of explanation.

In all forms of the apparatus of the invention as used in preheating cement raw material, the hot gases used are exhausted from the rotary cement kiln. The raw material to be heated is fed into the exhaust gas stream in such manner as to be borne along by the gases and the stream laden with the material enters a separator, in which the solids are collected while the gases are led off. The gases from the separator pass to a dust collector and the dust from the collector may then be combined with the raw material feed, or may be combined with the solids from the separator and fed into the kiln. If a greater heat recovery is desired, the raw material may be heated in two stages, each of which includes a separator. In a two stage installation, the raw material is fed into a duct leading to the separator in the second stage and the solids discharged from that separator are introduced into a gas stream leading from the dust chamber of the kiln to the first separator, while the solids from the first separator are fed into the kiln.

For a better understanding of the invention, reference may be had to the accompanying drawings, in which Fig. 1 is a diagrammatic side elevational view with parts broken away of a form of the apparatus of the invention, in which the heating occurs in two stages;

Fig. 2 is a diagrammatic side elevational view with parts broken away of a one stage heating apparatus;

Fig. 3 is a diagrammatic side elevational view with parts broken away of a modified form of a one stage heating apparatus;

Fig. 4 is a sectional view on the line 4—4 of Fig. 3;

Fig. 5 is a sectional view on the line 5—5 of Fig. 4; and

Fig. 6 is a fragmentary sectional view showing a modification of the apparatus shown in Fig. 3.

Figure 1:
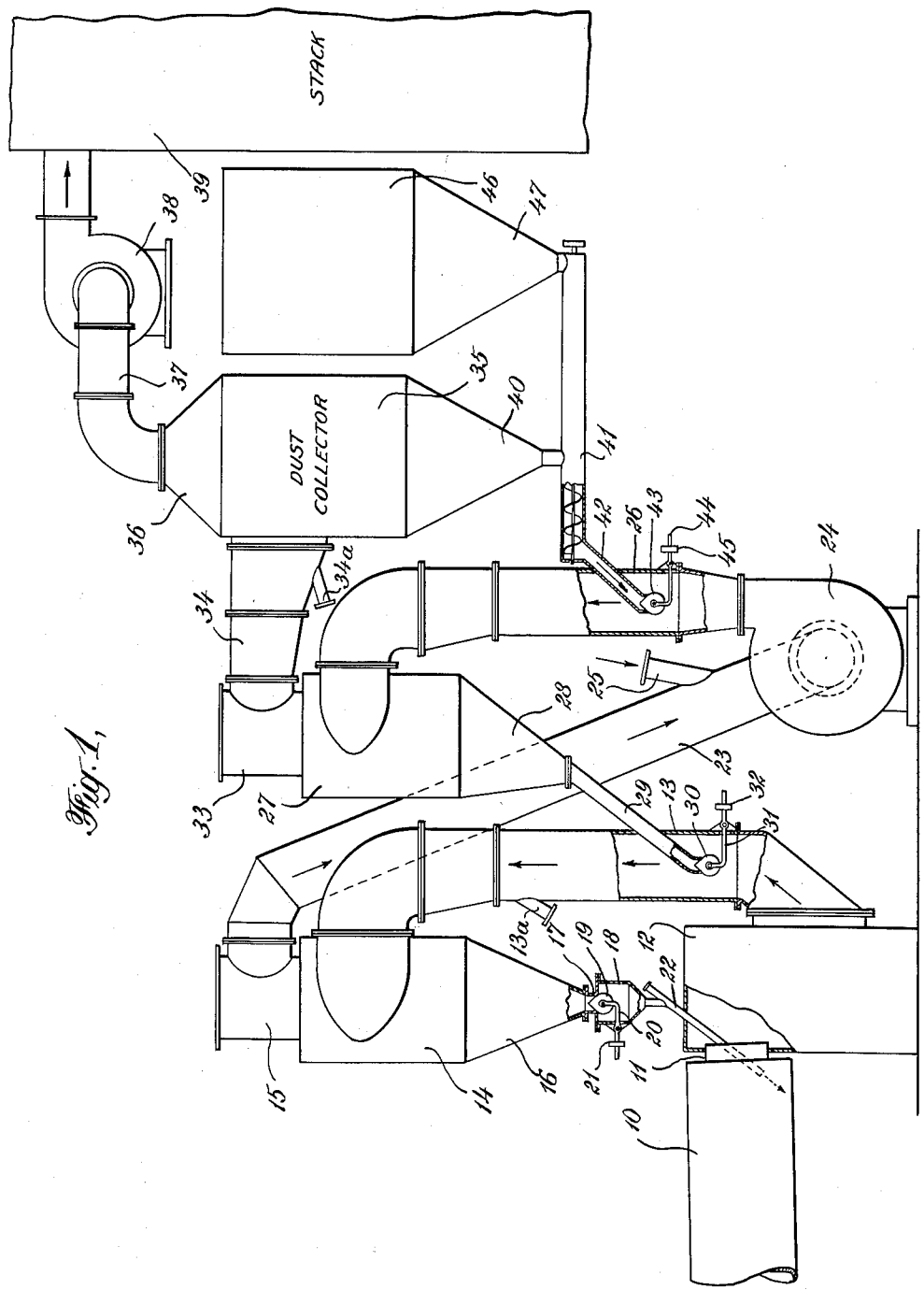

The apparatus illustrated in Fig. 1 comprises a rotary kiln 10 of conventional construction, which provides the hot gases employed in the heating operation, and the kiln has a section 11 at its upper end, the section entering a dust chamber 12. A duct 13 having an air inlet 13a leads upwardly from the dust chamber to the inlet of a separator 14, which is illustrated as being of the cyclone type. The separator has an outlet section 15 for gases at its top, and its lower end 16 is of conical form and is provided with an outlet 17 for solids. The solids outlet is provided with a sealed discharge device of any of the conventional types and, in the apparatus shown, the device comprises a chamber 18 containing a gate 19 for the outlet, the gate being mounted on a pivoted arm 20 carrying a weight 21 tending to swing the arm so that the gate normally closes the outlet. Whenever the weight of the solids in section 16 of the separator is sufficient, the gate is moved downwardly and the solids are discharged into chamber 18, from which they are conducted by the duct 22 through the dust chamber 12 into the upper end of the kiln.

The gas outlet from the top section 15 of separator 14 is connected by a duct 23 to the intake of a fan 24 and duct 23 is provided with an inlet 25, through which atmospheric air may be admitted in controlled quantities. The outlet from fan 24 is connected to a vertical duct 26 leading to the inlet of a separator 27 similar to separator 14, and solids collected in the lower end section 28 of separator 27 are conducted by duct 29 into duct 13 near the lower end thereof. The end of duct 29 within duct 13 is normally closed by a sealed discharge device, which may include a gate 30 mounted on a pivoted arm 31 carrying a weight 32. When the weight of the solids within duct 29 is sufficient, gate 30 is forced down and the solids are discharged into the gas stream flowing upwardly through duct 13.

The upper end section 33 of separator 27 has an outlet for gases, which is connected by a duct 34 with an air inlet 34a to the inlet of a dust collector 35, which may be of any of the well-known constructions. The dust collector has a top section 36 having a gas outlet connected by a duct 37 to the intake of a fan 38 discharging into a stack 39. The dust collected in the collector 35 is discharged from the lower end section 40 of the collector into the casing of a screw conveyor 41 and material discharged from the conveyor is conducted by a duct 42 into the vertical duct 26. The end of duct 42 within duct 26 is closed by a sealed discharge device, which may include a gate 43 mounted on a pivoted arm 44 having a weight 45, the gate normally closing the end of duct 42.

The raw material to be heated in the apparatus and then supplied to the kiln for burning therein is contained within a vessel 46 having a conical discharge section 47 leading into conveyor 41. The screw conveyor is continuously driven and, when the weight of the material fed by the conveyor into duct 42 is sufficient to counterbalance the gate 43, the gate permits the material to be discharged ino the gas stream flowing upwardly through duct 26.

In the operation of the apparatus shown in Fig. 1, the gases are drawn from the kiln at temperatures ranging from 300° C. to 1000° C., for example, and are passed through separator 14 by fan 24. From the fan, the gases continue into separator 27 and the gases are moved through separator 27 and dust collector 35 by the combined actions of fans 24 and 38. The raw material and dust enters the gas stream between the two separators 14 and 27 and, after being heated while being conveyed by the gas stream, the solids are separated from the stream in separator 27 and introduced into duct 13. In the travel of the gases through duct 13, the material is further heated, so that the solids separated in separator 14 and introduced into the kiln are at temperatures ranging from 300° C. to 1000° C., for example, and a large part of the heat from the gases leaving the dust chamber of the kiln is thus recovered.

While the two stage apparatus shown in Fig. 1 provides better heat recovery, it may be impractical in some installations to make use of two separators and, in such cases, a form of the apparatus for one stage heating may be used. The one stage apparatus shown in Fig. 2 includes a vertical duct 48 having an air inlet 48b and leading from the dust chamber 49 of a rotary kiln 50 to the inlet of a separator 51 having a gas outlet at its top connected by a duct 52 to a duct 53 having an air inlet 54. The duct 53 leads from the dust chamber 49 to the inlet of a dust collector 55 of conventional construction, and ducts 48 and 53 contain dampers 48a, 53a, respectively. The outlet of the dust collector is connected by a duct 56 to the intake of a fan 57 discharging into a stack 58. The dust collector is provided with a pair of hoppers 59 at its lower end which discharge into a screw conveyor 60. The bottom section of separator 51, in which the solids are collected, has an outlet 61 connected to conveyor 60. The screw of the conveyor is formed in two sections and section 62 lying in the part of the casing of the conveyor connected to the dust collector and the separator advances material to a duct 63 leading through the dust chamber 49 into the interior of kiln 50. The raw material is contained within a vessel 64 having a hopper bottom 65 leading into one end of the casing of conveyor 60 and the portion 66 of the screw within this section of the conveyor advances the material to a duct 67 having a slide gate 67a and discharging into the vertical duct 48 near its lower end.

In the normal operation of the apparatus of Fig. 2, dampers 48a and 53a are adjusted, so that the gases from the kiln flow through separator 51 and dust collector 55 to the stack. Raw material from vessel 64 is fed into the hot gases flowing upward through duct 48, while the solids removed from the gases in the separator and the dust collector enter conveyor 60 and are fed into the kiln. Whenever it is desired to have the gases from the kiln by-pass the separator 51, the damper 48a is closed, the damper 53a is opened, and the slide gate 67a is closed. The raw material feed then enters the kiln through duct 63.

In the form of apparatus shown in Fig. 3, the rotary kiln 68 is provided with a section 69 at its upper end, which is separated from the remainder of the kiln by a dam 70 and contains longitudinal lifting ribs 71. Hot gases issuing from the kiln pass through the end section 69 and then travel upwardly through a riser duct 72 having an air inlet 72a and leading to the inlet of a separator 73 having a bottom section 74 with an outlet 75 for separated solids. The outlet is provided with a sealed discharge device, which may include a chamber 76 containing a gate 77 mounted on a pivoted arm 78 provided with a weight 79 tending to swing the arm and cause the gate to close outlet 75. Chamber 76 has a bottom outlet connected by a duct 80 to an annular chamber 81 mounted on the outside of the kiln. The portion of the kiln within the chamber 81 is provided with angularly spaced inlet openings 82 through the kiln wall. The kiln carries individual scoops 83, which extend outwardly at respective openings and lie within chamber 81.

The separator 73 has a gas outlet at its top connected by a duct 84 with an air inlet 84a to a dust collector 85 of conventional construction. The dust collector has a gas outlet connected by a duct 86 to the intake of a fan 87 discharging into a stack and the dust collector has twin hoppers 88 for collected dust which discharge into the casing of a screw conveyor 89. A duct 90 leads from the outlet of the screw conveyor into the interior of casing 81.

The raw material is contained within a vessel 91 having a bottom outlet, from which material is conducted by a duct 92 into a screw conveyor 93 within the lower end of duct 72. The conveyor discharges the material into the lifter section 69 of kiln 68.

In the operation of the apparatus shown in Fig. 3, the hot gases from the kiln are drawn through duct 72, separator 73, and dust collector 85 by fan 87 before being discharged into the stack. The raw material fed into the lifter section 69 of the kiln is continuously lifted by the lifters and dropped into the stream of hot gases traveling through kiln section 69 into duct 72. The particles of raw material, which are sufficiently light, are entrained in the gas stream and carried along into separator 73, the particles being heated in their travel in the stream. After separation from the gas stream in separator 73, the heated particles enter the kiln. Any particles in the raw material feed, which are too heavy to be carried off by the gases passing through section 69, are heated by falling through the gases and ultimately enter the kiln over the dam 70.

In the construction shown in Fig. 3, the riser duct 72, which the gases enter immediately after leaving the kiln, is shown as having a heat resistant lining and such a lining is desirable, because of the high temperature of the gases. Similar linings may be employed in the duct 13 in the apparatus of Fig. 1, the duct 48 in the apparatus of Fig. 2, the separators 14, 27, 51 and 73, and such other parts of the apparatus as are in contact with gases or materials at high temperatures.

The construction shown in Fig. 6 is generally similar to that illustrated in Fig. 3 but differs therefrom as follows. The kiln 94 has a section 94a at its upper end, which is separated from the remainder of the kiln by a dam 95 and contains lifters 96. Hot gases from the kiln pass through section 94a and then travel through a duct 97 to a separator not shown but similar to separator 73. A duct 98 leads from the solids outlet of the separator into the lower end section 97a of duct 97. The gas outlet from the separator is connected to a dust collector not shown but similar to collector 85. Dust collected in the dust collector is introduced into the duct section 97a through duct 99 and raw material is discharged into duct section 97a through duct 100. The duct section 97a contains a screw conveyor 101, which is similar to conveyor 93.

In the operation of the apparatus shown in Fig. 6, the solids from the separator, the dust from the dust collector, and the raw material are all fed into the end section 97a of duct 97 and are then introduced into the upper end section 94a of the kiln. In section 94a, the materials are repeatedly raised by the lifters and showered down through the hot gases exhausting from the kiln, so that a good heat recovery is obtained. While this method of heat recovery is highly efficient, it is objectionable in ordinary installations because of the dust nuisance created. When the system includes the flash preheating apparatus of the invention, the dust collection prevents the loss of dust and the desirable method of heat transfer may be employed.

The air inlets 13a, 25, and 34a in Fig. 1, 48b and 54 in Fig 2, and 72a and 84a in Fig. 3 may be employed to admit atmospheric air into the apparatus to lower the temperature of the gas stream and thus protect elements of the apparatus. Thus, in the installation shown in Fig. 1, air admitted through inlet 13a lowers the temperature of the hot gases passing from the kiln to the first separator 14 and protects that separator against injury from being overheated. Similarly, air admitted through inlet 25 protects the second separator 27 against injury that might result from overheating, in the event that the raw material delivery into duct 26 failed and the gases flowing through the duct were not lowered in temperature by such raw material feed. The inlet 34a provides control of the temperature of the gases entering the dust collector 35. The air inlets in the other forms of apparatus provide like control of the temperature of the gases entering elements of the apparatus, such as separators and dust collectors, beyond the inlets in the direction of gas flow.

I claim:

1. In an apparatus for heating pulverulent material to be burned in an inclined rotary kiln by waste gases from the kiln, the combination of an end section mounted coaxially with the kiln at its upper end and containing lifters, a gas duct leading from the end section, a separator having an inlet and separate outlets for gases and solids, the duct leading to the inlet of the separator, a fan connected to the separator and causing a flow of gases through the duct and separator, means for introducing raw pulverulent material into the kiln end section to be lifted by said lifters and dropped, means for feeding material into the kiln, and means for conducting solids from the solids outlet of the separator to said feeding means.

2. In an apparatus for heating pulverulent material to be burned in an inclined rotary kiln by waste gases from the kiln, the combination of an end section mounted coaxially with the kiln at its upper end and containing lifters, a separator having an inlet and separate outlets for gases and solids, a dust collector having an inlet and separate outlets for gases and solids, connections for conducting waste gases from the end section to the separator inlet, from the separator gas outlet to the dust collector inlet, and from the dust collector gas outlet to the atmosphere, a fan in one of the connections for causing a flow of gas through the connections, the separator, and the dust collector to the atmosphere, means for introducing raw pulverulent material into the kiln end section to be lifted by the lifters and dropped, means for feeding material into the kiln downward from the end section, and means for conducting solids from the solids outlets of the separator and dust collector to the feeding means.

3. In an apparatus for heating pulverulent material to be burned in an inclined rotary kiln by waste gases from the kiln, the combination of an end section mounted coaxially with the kiln at its upper end and containing lifters, a separator having an inlet and separate outlets for gases and solids, a dust collector having an inlet and separate outlets for gases and solids, connections for conducting waste gases from the end section to the separator inlet, from the separator gas outlet to the dust collector inlet, and from the dust collector gas outlet to the atmosphere, a fan in one of the connections for causing a flow of gas through the connections, the separator, and the dust collector to the atmosphere, means for introducing raw pulverulent material into the kiln end section, and means for conducting solids from the solids outlets of the separator and dust collector into the kiln end section, said pulverulent material and solids introduced into the kiln end section being lifted by said lifters and then dropped.

4. In apparatus for preheating pulverulent material to be burned in an inclined rotary kiln by waste gases from the burning operation, the combination of a dust chamber communicating with the upper end of the kiln for receiving gases discharged from the kiln, a separator having an inlet and separate outlets for solids and gases, a dust collector having an inlet and separate outlets for dust and gases, connections for leading waste gases from the dust chamber to the inlet of the separator, from the gas outlet of the separator to the inlet of the dust collector, and from the gas outlet of the dust collector to the atmosphere, a fan for causing a flow of gas through the connections, separator, and dust collector to the atmosphere, means for feeding raw pulverulent material into the gases flowing through the connection leading to the inlet of the separator, means for delivering solids from the solids outlet of the separator into the gases flowing through the connection leading to the inlet of the separator, and means for conducting dust from the solids outlet of the dust collector into the gases flowing through the connection leading from the dust chamber to the inlet of the separator.

5. Apparatus for preheating pulverulent material to be burned in a kiln by waste gases from the burning operation, which comprises a first separator and a second separator, each having an inlet and separate outlets for solids and gases, a dust collector having an inlet and separate outlets for gases and solids, connections for leading waste gases from the kiln to the inlet of the first separator, from the gas outlet of the first separator to the inlet of the second, from the gas outlet of the second separator to the inlet of the dust collector, and from the gas outlet of the dust collector to the atmosphere, a fan for causing a flow of gas through the connections, the first and second separators, and the dust collector to the atmosphere, means for delivering dust from the dust outlet of the dust collector into the connection leading to the inlet of the second separator, means for delivering solids from the solids outlet of the second separator into the connection leading to the inlet of the first separator, means for delivering solids from the solids outlet of the first separator to the kiln, and means for feeding raw pulverulent material into the connection leading to the inlet of the second separator.

6. Apparatus for preheating pulverulent material to be burned in a kiln by waste gases from the burning operation, which comprises a series of separators, each having an inlet and separate outlets for solids and gases, a dust collector having an inlet and separate outlets for gases and dust, connections for leading waste gases from the kiln to the inlet of the first separator in the series, from the gas outlet of each separator (except the last) in the series to the inlet of the following separator in the series, from the gas outlet of the last separator in the series to the inlet of the dust collector, and from the gas outlet of the dust collector to the atmosphere, a fan for causing a flow of gases through the connections, separators, and collector, means for delivering solids from the solids outlet of each separator (except the first) in the series into the gas stream flowing through the connection leading to the inlet of the preceding separator in the series, means for conducting dust from the dust outlet of the dust collector into the gas stream flowing through the connection leading to the inlet of one of the separators in the series, means for feeding raw material into the gas stream flowing through a connection leading to the inlet of a separator, and means for conducting solids from the solids outlet of the first separator to the kiln.

7. Apparatus for preheating pulverulent material to be burned in a kiln by waste gases from the burning operation, which comprises a series of separators, each having an inlet and separate outlets for solids and gases, a dust collector having an inlet and separate outlets for gases and dust, connections for leading waste gases from the kiln to the inlet of the first separator in the series, from the gas outlet of each separator (except the last) in the series to the inlet of the following separator in the series, and from the gas outlet of the last separator in the series to the inlet of the dust collector, a fan for causing a flow of gases through the connections, separators, and collector, means for delivering solids from the solids outlet of each separator (except the first) in the series into the gas stream flowing through the connection leading to the inlet of the preceding separator in the series, means for feeding raw material into the gas stream flowing through a connection leading to the inlet of a separator, means for delivering dust from the dust outlet of the dust collector into the gas stream flowing through the connection leading to the inlet of one of the separators in the series, means for conducting solids from the solids outlet of the first separator to the kiln, and an air inlet in at least one of the connections through which the hot gaseous stream from the kiln is passing for admitting air to be mixed with the gas stream flowing through the connection to reduce the temperature of the gas stream.

8. Apparatus for preheating pulverulent material to be burned in a kiln by waste gases from the burning operation, which comprises a separator having an inlet and separate outlets for solids and gases, a dust collector having an inlet and separate outlets for solids and gases, connections for leading waste gases from the kiln to the inlet of the separator and from the gas outlet of the separator to the inlet of the dust collector, a fan for causing a flow of gases through the connections, separator, and dust collector to the atmosphere, means for introducing raw pulverulent material into the gases flowing through the connection leading to the inlet of the separator, means for delivering dust from the dust outlet of the dust collector into the connection leading to the inlet of the separator, means for delivering solids from the solids outlet of the separator to the kiln, means for delivering dust from the dust outlet of the dust collector into the connection leading to the inlet of the separator, and an inlet in at least one of the connections through which the hot gaseous stream from the kiln is passing for admitting air into the connection to reduce the temperature of the gas stream flowing through the connection.

9. Apparatus for preheating pulverulent material to be burned in a kiln by waste gases from the burning operation, which comprises a separator having an inlet and separate outlets for solids and gases, a dust collector having an inlet and separate outlets for solids and gases, connections for leading waste gases from the kiln to the inlet of the separator and from the gas outlet of the separator to the inlet of the dust collector, means for delivering solids from the solids outlets of the separator and dust collector to the kiln, a by-pass around the separator from the connection leading to the separator inlet to the connection leading to the dust collector inlet, means for controlling flow through the by-pass, and means for introducing raw pulverulent material into the connection leading to the separator inlet at a point beyond the junction of said connection and the by-pass.

10. In apparatus for preheating pulverulent material to be burned in an inclined rotary kiln by waste gases from the burning operation, the combination of a dust chamber communicating with the kiln for receiving gases discharged from the kiln, a separator having an inlet and separate outlets for solids and gases, a dust collector having an inlet and separate outlets for dust and gases, connections for leading waste gases from the dust chamber to the inlet of the separator, from the gas outlet of the separator to the inlet of the dust collector, and from the gas outlet of the dust collector to the atmosphere, a fan for causing a flow of gas through the connections, separator, and dust collector to the atmosphere, means for feeding raw pulverulent material into the gases flowing through the connection leading to the inlet of the separator, means for delivering solids from the solids outlet of the separator into the gases flowing through the connection leading to the inlet of the separator, means for conducting dust from the solids outlet of the dust collector into the gases flowing through the connection leading from the dust chamber to the inlet of the separator, and means for normally sealing said dust conducting connection against the pressure of the gases flowing through the connections from the kiln to the inlet of the separator.

References Cited in the file of this patent

UNITED STATES PATENTS

| | | |
|---|---|---|
| 2,290,068 | Petersen | July 14, 1942 |
| 2,478,970 | Koon | Aug. 16, 1949 |
| 2,559,876 | Hoestra | July 10, 1951 |
| 2,590,090 | DeVaney | Mar. 25, 1952 |
| 2,663,560 | Muller et al. | Dec. 22, 1953 |